Patented Feb. 3, 1953

2,627,510

UNITED STATES PATENT OFFICE 2,627,510

INHIBITION OF GELATION OF POLYMERIZABLE MIXTURES

Earl E. Parker, Milwaukee, Wis., assignor to Pittsburgh Plate Glass Company, Allegheny County, Pa., a corporation of Pennsylvania No Drawing. Application January 19, 1948,
Serial No. 3,179

3 Claims. (Cl. 260—45.4)

The present invention relates to the preservation of mixtures of polymerizable compounds and it has particular relation to the preservation of mixtures of olefinically unsaturated monomers and polyesters of glycols and ethylenically unsaturated dicarboxylic acids.

One object of the invention is to provide a catalyzed but stabilized mixture of a polyester of an ethylenically unsaturated dicarboxylic acid and a monomeric olefinically unsaturated compound which can be stored for substantial periods of time without danger of premature gelation.

A second object is to provide a stabilized mixture of the above indicated type which when subjected to molding or casting operations, or to other curing operations, will copolymerize to hard infusible state in substantially the same manner as conventional, unstabilized mixtures of the same polyesters and polymerizable, monomeric, olefinically unsaturated compounds.

A third object is to provide a simple and convenient process of preparing such stabilized mixtures. These and other objects of the invention will be apparent from consideration of the following specification and the appended claims.

Resinous products have heretofore been prepared by copolymerizing mixtures of polymerizable olefinically unsaturated monomers such as styrene and polyesters of ethylenically unsaturated acids, such as maleic acid or fumaric acid and glycols such as diethylene glycol or propylene glycol.

It has been recognized that the copolymerization involves the cross-linking of the polyester molecules, which apparently constitute long unsaturated chains, at the points of unsaturation in the chain. The process has been discussed in such articles as that contained in Industrial and Engineering Chemistry, December 1939, page 1512, or Industrial and Engineering Chemistry, January 1940, page 64. The patent art on this type of resinous product is also quite extensive. Many examples of this type of product are included in such patents as Patents 2,255,313 or 2,308,495 and 2,409,633.

The products, as obtained by the various processes of the prior art, are thermosetting resins. The copolymerizable mixtures are characterized by a rapid rate of polymerization even in the absence of substantial pressures and at moderate temperatures. Indeed an objectionable feature of the processes and products as disclosed in the prior art resides in the fact that the copolymerizable mixtures of polyesters and olefinically unsaturated monomer tend to set up or gel within a short time so that the mixtures when made up, must be subjected to curing within a very short time after they are formed. This is often an inconvenience since it may be desired to ship or store considerable volumes of mixture in the fluid state.

It has been recognized that the addition of small amounts of soluble, neutral or acid ammonium salts, to the polymerizable mixtures have a very pronounced tendency to retard the gelling action of the mixtures so long as catalysts of polymerization such as benzoyl peroxide or other catalysts of cure are not incorporated. For example, very satisfactory inhibition of premature gelation of uncatalyzed mixtures can be obtained by the addition of approximately .01 to 2% of triethyl or trimethyl benzyl ammonium chloride to the copolymerizable mixtures. In like manner, other quaternary ammonium salts or hydrohalides of tertiary amines such as the hydrochloride of triethyl amine and the like can be added to copolymerizable mixtures of the polyesters and olefins such as styrene to obtain mixtures which in the absence of catalysts, can be stored for many months without danger of premature gelation at ordinary temperatures. These stabilized mixtures can be admixed with peroxide catalysts and if they are used up promptly, can be molded or cast in much the same manner as the unstabilized mixtures. They can be cured by heating to temperatures, for example of 90 to 250° C. or more to provide completely cured thermoset resins of high technical merit.

The satisfactory cure of the copolymerizable mixtures of polyesters and monomers usually requires the use of an appropriate catalyst of addendum reaction. Most of the catalysts conventionally employed comprise organic peroxides such as benzoyl peroxide, tertiary butyl hydroperoxide, lauroyl peroxide, ditertiary butyl peroxide and various other peroxidic compounds. While the inhibitors above discussed, namely the neutral or acidic salts of amines are very satisfactory as inhibitors so long as peroxide catalysts are not included in the polymerizable mixture, they are quite ineffective as stabilizers in the presence of the latter. This is somewhat disadvantageous inasmuch as it requires that the polymerizable mixtures be subjected to curing operations within a short time, for example, a few hours after the peroxide type catalyst is incorporated. This of course necessitates the preparation of comparatively small quantities of catalyzed mixture at frequent intervals. Of course after the catalyst has been added, the conventional mixtures cannot be stored for appreciable time and neither can they be shipped for any substantial distance.

The present invention is based upon the discovery that chloranil in combination with a quaternary ammonium salt constitutes a good inhibitor for mixtures of polyesters of the above indicated type and polymerizable olefinically unsaturated monomers such as styrene, which mixtures include a catalyst of the peroxide type, e. g. benzoyl peroxide. The chloranil together with the quaternary ammonium salt even in presence of the catalyst of addition successfully stabilizes the polymerizable mixtures for considerable periods of time so that the relatively large batches can be mixed up and (held for use) without gelling. On the other hand, the two are found to lose their inhibitory action as the temperature of the mixture approaches the conventional curing temperature which is ordinarily employed in the preparation of resins from this type of mixture so that the mixtures can be cured as though no inhibitor was present.

Appropriate polyester and monomeric olefinically unsaturated compounds capable of copolymerization therewith may include the following components:

I. Polyester, 50 parts by weight
II. A monomer, 10 to 100 parts by weight
III. Peroxide catalyst, .01 to 5% based upon the polymerizable components of the mixture
IV. Chloranil, .001 to 2% based upon the polymerizable mixture
V. Ammonium salt, .001 to 2% based upon the polymerizable mixture
VI. Quinone (optional), .001 to 0.05% based upon the polymerizable mixture The quaternary ammonium salts such as trimethyl, benzyl, ammonium chloride or a tertiary amine salt of the type already discussed may be added to the mixture of polyester and monomeric olefinically unsaturated compound prior to the incorporation of the peroxide catalyst. Such mixtures may conveniently be stored for long periods of time, e. g. for many months so long as the peroxide catalyst is not added. This component is optional dependent upon the length of time which the resinifiable components are to be stored prior to the incorporation of the peroxide type catalyst. If the time of storage is short such inhibitor is not required.

The two types of inhibitors, namely a quaternary ammonium salt and the chloranil are present simultaneously in the mixture. The first mentioned compound is effective for prolonged storage in the absence of the peroxide catalyst whereas the chloranil becomes effective and is especially desirable after the addition of the catalyst.

The present invention is applicable to a broad class of polyesters. For example, the polyester (component I) can be selected in accordance with the disclosure of the above mentioned publications or patents. The same is also true of the olefinically unsaturated monomer (component II) of the polymerizable mixture. Appropriate polyesters include the polyesters of such unsaturated acids as maleic acid, fumaric acid, itaconic acid and the like. Very substantial proportions of the ethylenically unsaturated dicarboxylic acid may also be replaced by saturated dicarboxylic acid such as phthalic acid, sebacic acid, azelaic acid, succinic acid, adipic acid and others. Usually the molecular proportion of the saturated acid will not exceed 6 mols per mol of the ethylenically unsaturated acid but the proportion may be of substantially any value below 6 mols. As the proportion of the saturated acid is increased with respect to the unsaturated acid, when cured, the product tends to become progressively softer and more rubber like in its characteristics. A part e. g. 10%, of the polyester molecule may also comprise a monocarboxylic acid such as linoleic acid, stearic acid or the like.

The glycol component of the polyesters contemplated by the present invention will include the various dihydric alcohols such as propylene glycol, diethylene glycol, triethylene glycol, tetraethylene glycol and polyethylene glycols, for example up to 1,000 or 2,000 molecular weight. The glycolic component will approximately equal in molar proportion the dicarboxylic acid or the sum of the dicarboxylic acid or the dicarboxylic acids and the monocarboxylic acid (assuming the monocarboxylic acid is present). It is convenient to operate with a slight excess of the dihydric alcohol, e. g. 10 or 20% excess.

The polyester preferably will be of an acid value within a range of 10 to 100. A very satisfactory range will be approximately 30 to 50.

The olefinically unsaturated monomer (component II) in the copolymerizable mixture may be selected in accordance with the disclosures of the above indicated art. Styrene is one very satisfactory monomer containing an olefin group. However, divinyl benzene, diallyl phthalate, allyl acetate and many others may also be employed in the practice of the invention.

The peroxide catalyst (component III) includes any of the conventional peroxides employed as addendum reaction catalysts, including benzoyl peroxide, tertiary butyl hydroperoxide, ditertiary butyl peroxide, lauroyl peroxide and a great many others.

When the gelation inhibitor (component V) is to be added the polymerizable mixture of polyester and monomeric olefin should be warmed and the gelation inhibitor added, or the gelation inhibitor may be added and the mixture then warmed up until the inhibitor goes into solution. The following examples constitute specific illustrations of the application of the principles of the invention. Gelation catalysts such as thioglycolic acid or esters thereof may be added to the polymerizable mixtures just prior to cure. These may be in amounts of .001 to 2% of the polymerizable mixture.

*Example 1*

67 parts propylene maleate phthalate
33 parts styrene
0.1 part trimethyl benzyl ammonium chloride
0.001 part quinone
0.8 part benzoyl peroxide This material gelled in 20 hours at 77° F. When 0.1 part of chloranil was added, the same mixture gelled only after 14 days of storage at 77° F.

*Example II*

67 parts diethylene propylene maleate
33 parts styrene
0.1 part trimethyl benzyl ammonium chloride
0.001 part quinone
0.8 part benzoyl peroxide This material gelled in 2 hours at 77° F. When 0.05 part chloranil was added the mixture gelled only after being stored for 4 days at 77° F.

*Example III*

67 parts propylene maleate
33 parts styrene
0.1 part trimethyl benzyl ammonium chloride
0.001 part quinone
0.8 part benzoyl peroxide This mixture gelled in 20 hours at 77° F. The addition of 0.002 part chloranil increased the storage life to 42 hours.

*Example IV*

67 parts diethylene fumarate phthalate
33 parts styrene
0.1 part trimethyl benzyl ammonium chloride
0.8 part benzoyl peroxide This mixture gelled in 2 hours at 77° F. The addition of 0.05 part of chloranil increased the storage life to 48 hours.

*Example V*

67 parts diethylene maleate phthalate
33 parts styrene
0.1 part trimethyl benzyl ammonium chloride
0.8 part benzoyl peroxide This mixture gelled in 4 hours at 77° F. The addition of 0.05 part of chloranil increased the storage life to 4 days at 77° F.

*Example VI*

80 parts propylene maleate phthalate
20 parts styrene
0.1 part trimethyl benzyl ammonium chloride
1.0 part benzoyl peroxide This mixture gelled in 4 hours at 100° F. The addition of 0.05 part chloranil increased the storage life of the resin to 3 days at 100° F.

Polymerizable mixtures of polyesters and monomeric olefinically unsaturated compounds, such as those shown in the examples, which contain peroxide catalysts chloranil and quaternary ammonium salt can be cured in conventional manner. For example, the liquid mixtures may be cast or poured into molds and then subjected to a curing temperature, e. g. 90 to 200 or 250° C. or to such other temperature as may seem expedient so long as it is not so low as excessively to prolong the time of curing or so high as to cause undue discoloration or decomposition of the mixture or the product.

It is also permissible to incorporate the polymerizable mixture with fillers such as fiber glass, wood flour, cotton floc, asbestos, titanium dioxide, blanc fixe, whiting or any of the other conventional filler materials, of pulverulent or fibrous nature. These fillers may be incorporated in substantially any proportion desired, for example in such amount as to opacify the mixture or in much larger amounts, e. g. up to 75 or 80% of the mixture. 30 to 70% would seem to be an appropriate range for most mixtures. Mixtures containing high amounts of fillers are usually soft, crumbly masses that can be introduced into molds and formed under heat and pressure into resinous articles such as containers and a wide variety of other articles too numerous to mention in the present specification.

The forms of the invention herein described are by way of example. It will be apparent to those skilled in the art that numerous modifications may be made therein without departure from the spirit of the invention or the scope of the appended claims.

I claim:

1. In the method of treating a copolymerizable mixture of (A) a polyester of an alpha-beta ethylenic, alpha-beta dicarboxylic acid and (B) an ethylenic compound copolymerizable therewith, the mixture being subjected to a prolonged period of storage in uncatalyzed state and to a substantial period of storage after the addition of peroxide catalysts of polymerization; the steps comprising incorporating into the mixture before the periods of storage, chloranil and a trialkyl benzyl ammonium chloride in amounts to inhibit premature gelation of the mixture during said periods of storage.

2. In the method of treating a copolymerizable mixture of (A) a polyester of an alpha beta ethylenic alpha-beta dicarboxylic acid (B) an ethylenic compound copolymerizable therewith, the mixture being adapted to be subjected to a prolonged period of storage in uncatalyzed state and to a substantial period of storage after the addition of catalysts said mixture further containing chloranil and a trialkyl benzyl ammonium chloride in amounts to inhibit premature gelation during said periods of storage; the steps comprising adding to said mixture, between said periods of storage, a peroxide catalyst of copolymerization in an amount of 0.01 to 5 per cent based upon the polymerizable components of the mixtures and at the conclusion of the periods, heating the mixture to curing temperature.

3. A copolymerizable mixture of 50 parts by weight of styrene, 10 to 100 parts by weight of a long chain polyester of a saturated dihydric alcohol consisting of carbon, hydrogen, and oxygen and a mixture of dicarboxylic acids at least one mole in 7 of which is alpha-beta dicarboxylic, alpha-beta ethylenically unsaturated, the total acids being present in molar proportion with respect to the dihydric alcohol, said mixture further containing 0.01 to 5 per cent by weight based upon the copolymerizable components in the mixture of a peroxide catalyst of polymerization, 0.001 to 2 per cent by weight of chloranil and 0.001 to 2 per cent by weight of trialkyl benzyl ammonium chloride in which the alkyl groups each contain one to two carbon atoms.

EARL E. PARKER.

REFERENCES CITED

The following references are of record in the file of this patent:

UNITED STATES PATENTS

| Number | Name | Date |
|---|---|---|
| 2,225,471 | Foord | Dec. 17, 1940 |
| 2,255,313 | Ellis | Sept. 9, 1941 |
| 2,450,552 | Hurdis | Oct. 5, 1948 |
| 2,466,800 | Fisk | Apr. 12, 1949 |

FOREIGN PATENTS

| Number | Country | Date |
|---|---|---|
| 540,167 | Great Britain | Oct. 8, 1941 |
| 567,879 | Great Britain | Mar. 7, 1945 |